Feb. 14, 1950
R. S. CLAY ET AL
2,497,345
APPARATUS FOR FINE MEASUREMENTS SUCH AS COMPARATORS AND EXTENSOMETERS
Filed Dec. 11, 1944
2 Sheets-Sheet 1
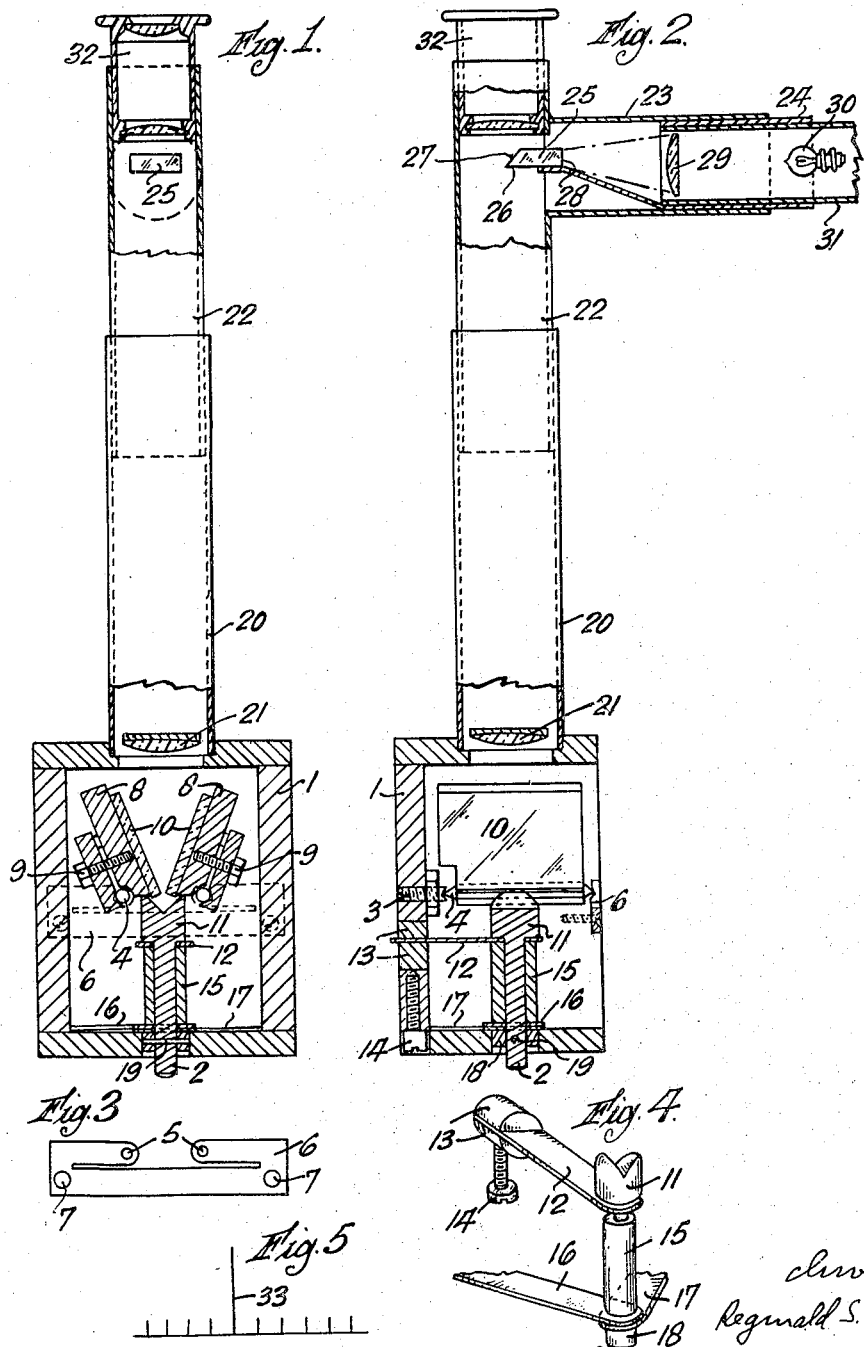

Feb. 14, 1950 R. S. CLAY ET AL 2,497,345
APPARATUS FOR FINE MEASUREMENTS SUCH
AS COMPARATORS AND EXTENSOMETERS
Filed Dec. 11, 1944 2 Sheets-Sheet 2
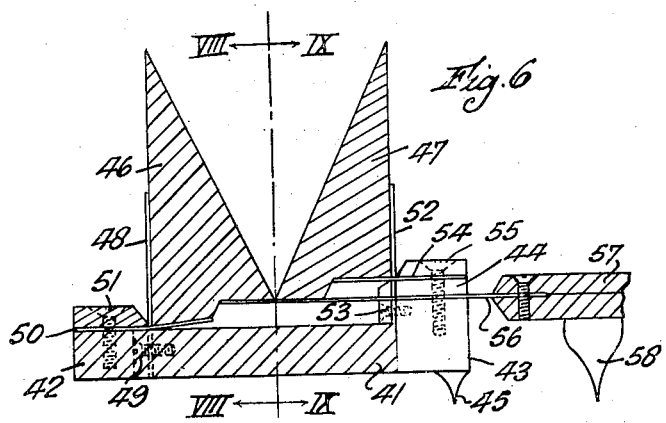
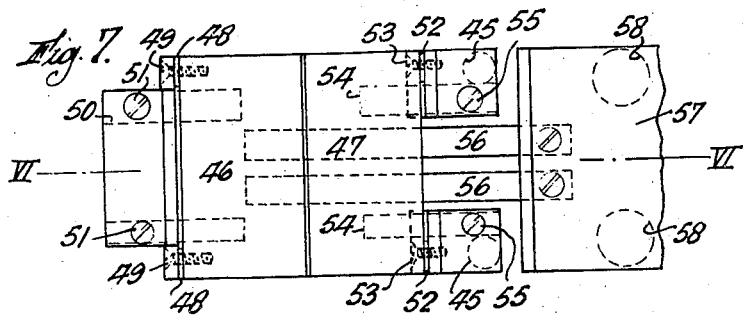
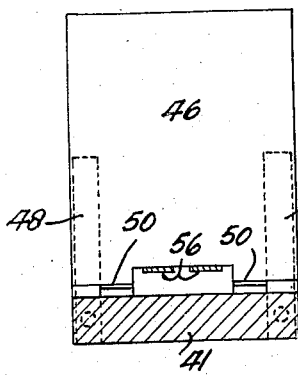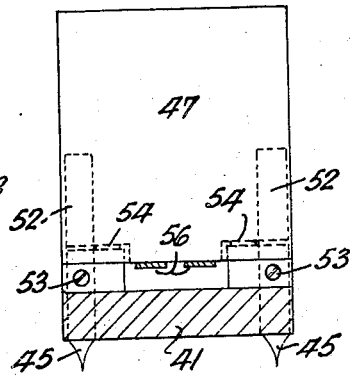
Inventors,
Reginald S. Clay, and
James A. Moore.
By their attorneys.
Baldwin & Wight Patented Feb. 14, 1950

2,497,345

UNITED STATES PATENT OFFICE 2,497,345

APPARATUS FOR FINE MEASUREMENTS SUCH AS COMPARATORS AND EXTENSOMETERS

Reginald Stanley Clay and James Alfred Moore, Mill Hill, London, England, assignors to United Kingdom Optical Company, Limited, London, England Application December 11, 1944, Serial No. 567,620
In Great Britain February 14, 1944

3 Claims. (Cl. 33—169)

The invention relates to apparatus for fine measurements in which a small movement is magnified to increase the accuracy of reading. One class of such apparatus includes comparators having a pin to make contact with one end of an object resting by its other end on a fixed base. Another class includes extensometers for measuring a change of dimensions due to the application of a force which stresses the material.

A surface extensometer has been proposed in which a mirror was tilted more or less by the movement of a gauge point, and a fixed mirror at right angles to the first in its normal position was used to form in a collimating telescope duplicate images of a slit by reflection in both mirrors but in opposite sequence, the measurement being effected by reading the traverse of a micrometer eyepiece when moved from one image to the other.

It is an object of the present invention to provide apparatus for fine measurements with increased multiplying effect due to repeated reflection.

It is a further object of the invention to provide such apparatus with two mirrors set normally at an angle which is a sub-multiple of 180°, means for tilting both mirrors in opposite directions in proportion to a difference of dimension to be measured, and means for observing the relative shift due to the change of angle between the mirrors of two images produced by light reflected by the mirrors in turn, the light for forming one image being reflected first by one mirror and that for forming the other image being reflected first by the other mirror.

If the mirrors are set at 90°, one image is made up of light which has been reflected in the first mirror and then the second, and the other of light which has been reflected in the second mirror and then the first. The preferred arrangement is to have the mirrors normally at 45° or sometimes 60°. With mirrors at 60° the light for one image is reflected in the first mirror, the second and the first again, while that for the other image is reflected in the second mirror, the first and then the second again. With mirrors at 45° the sequence of reflection would be first-second-first-second mirror for one image and second-first-second-first mirror for the other. The angular displacement between the reflected rays would in the case of mirrors at 60° and 45° be twelve and sixteen times the angle of displacement of each mirror respectively.

The departure from the exact 45° can be observed by the naked eye by noting the alteration in shape of the image of the observer's pupil, but it is preferable to observe the relative displacement of the images by means of an autocollimator with a scale or other marking in its principal focal plane. In this case the rays of light constituting any point on either image are parallel over the part of their path which includes the mirrors.

The invention will be better understood from the following description of two forms of construction shown in the accompanying drawings, in which Figure 1 is an elevation of a comparator taken mainly in section on the central axis, Figure 2 is a similar view but in side elevation, Figure 3 is a plate for mounting the mirror pivots, Figure 4 is a perspective view of the feeler pin and its mounting, Figure 5 is an enlarged view of the scale, Figure 6 is an elevation of the mirror portion of an extensometer taken in section on the line VI—VI of Figure 7, Figure 7 is a plan of the same, Figure 8 is a side elevation of the same in central section viewed in the direction of the arrows VIII—VIII of Figure 6, and Figure 9 is a similar view but in the direction of the arrows IX—IX of Figure 6.

Referring first to Figures 1 and 2, a comparator comprises a rectangular metal casing 1 to contain the mirror system. A feeler pin 2 projects through a hole in the bottom of the casing to make contact with the upper surface of a specimen to be measured. The specimen will as usual be supported on a surface plate, and the casing 1 will also be supported on the surface plate by means of blocks of known height. The surface plate, blocks and specimen are not shown, since they are arranged in accordance with standard practice.

The front of the casing 1 is open, as shown to the right hand side of Figure 2, to provide access to the parts to be described next. Two screws 3 project through the back wall of the casing 1 and are fixed by lock-nuts. The screws form rear bearings for steel pins 4, 4 pointed at each end to a cone of about 60° vertical angle and hardened. Each screw 3 has a conical recess punched or otherwise formed with a tool having a cone angle rather larger than 60°, say 65°. At the bottom of the recess a small hole or recess is drilled or punched, in the latter case with a smaller angle than 60°, to leave as actual bearing surface a ring of about 0.013" diameter.

The front ends of the pins are supported in similarly formed bearings 5, 5 in a thin spring 6 of German silver. The spring 6 is shown in Figure 3 as viewed from inside the casing 1. It spans the sides, to which it is fixed by screws passing through holes 7, 7.

Each pin 4 is clamped to a block 8 by a screw 9 and is located in a groove in the block. Each block 8 has mounted on it a front-aluminized mirror 10, the two mirrors being normally at 45° to each other and symmetrically located about the vertical centre line of the apparatus.

The feeler pin 2 has a short cylindrical head 11 divided by a central V-notch into two rounded edges, one located under each block 8, so that an upward movement of the pin 2 tilts the mirrors 10 in opposite directions and increases the angle between them. In the normal position the points at which the top edges of the feeler pin make contact with the blocks 8 are in the horizontal plane containing the axes of the hinge pins 4, 4. These points on the blocks thus move in a practically vertical direction. The bottom edges of the mirror faces 10, 10 are also in the same plane. As a result the separation of the edges remains practically constant and can be made very small.

The mounting of the feeler pin 2 is best seen from Figure 4. Under the head 11 a flat spring 12 is threaded over the pin, and its rear end is clamped between two semicylindrical blocks 13, 13 in the back wall of the casing 1 by means of a screw 14. Next below the spring 12 is a sleeve 15 to act as a spacer. Figure 4 shows the sleeve 15 away from the spring 12 to indicate the construction more clearly. Two flat springs 16 and 17 are next threaded on to the pin 2. These are placed at right angles to each other and in plan at 45° to the spring 12. They are fixed at the back of the casing 1 on the inside of its bottom face. Then a collar 18 fixed by a taper pin 19 holds the whole assembly together. The parts assembled on the pin 2 are cemented together by wax or other suitable cement so as to move as a whole.

It will be seen that, as the protruding bottom end of the feeler pin 2 is pushed upwards, the springs 12, 16 and 17 constrain the pin to move only in the direction of its axis and maintain it in the right relation to the blocks 8. The springs also tend to return the pin 2 to its lowest or rest position and ensure that the pressure of the head of the feeler pin on the specimen being measured is always the same.

The tilt of the mirrors 10 is observed by an autocollimator set up with its optical axis vertical and passing through the narrow gap between the two mirrors. The autocollimator comprises a vertical tube 20 with achromatic lens 21 at its lower end and fixed on the top face of the casing 1. A second tube 22 carries the remainder of the optical elements and can slide in the tube 20 for focusing the lens 21.

A horizontal tube 23 branches off from the tube 22, and a tube 24 can slide in the tube 23. The tube 24 carries a prism 25 on an extension piece to project into the tube 22. The prism 25 has a scale engraved in clear lines on a black ground at the outer edge of its lower face 26. The scale is shown enlarged in Figure 5. The prism 25 also has a 45° reflecting face 27 and a vertical grey face 28. A condenser 29 and pea lamp 30 may if desired be mounted in a tube 31 which slides in the tube 24 for focusing the pea lamp on to the grey face 28, but in many cases the ambient light falling on the face 28 is sufficient. Light from the face 28 is reflected by the face 27 on to the scale marks on face 26, which is adjusted to be in the principal focal plane of the lens 21.

The light proceeding from the scale on face 26 and through the lens 21 is reflected in both sequences by the mirrors 10, 10 and returns through the lens 21 to form two images of the scale in the same plane as the face 26. These images (normally coincident) are observed by a Ramsden eyepiece 32, which can slide in the upper part of the tube 22 for focusing. The movement of the tube 24 in the tube 23 is to ensure that the scale images fall clear of the prism 25, so that the prism does not hamper observation.

The length of the scale is in plan view at right angles to the pivot axes of the mirrors 10 and the scale as shown in Figure 5 has a zero mark 33 longer than the other graduation marks. In use the instrument is adjusted so that with a standard object in place under the feeler pin 2 the two images of the mark 33 coincide. When a specimen to be compared with the standard object is put into place, any difference of measurement is indicated by the separation between the two images of the mark 33 measured by the scale graduations.

Figures 6 to 9 show the parts of an extensometer corresponding to the parts of Figures 1 and 2 enclosed in the casing 1. It is understood that the extensometer will include a suitable casing for the parts shown, means for attaching the casing to the specimen to be observed and an auto-collimator. The casing and attaching means are within the competence of those versed in the art, and the auto-collimator may be in accordance with Figures 1 and 2.

A base plate 41 of generally rectangular form has at one end a rectangular extension 42 and at the other end two lugs 43 integral with blocks 44 projecting above the general level of the upper surface of the base 41. Gauge points 45, 45 on the underside of the lugs 43 are adapted to support the instrument in punch marks at one end of the part of the specimen under test.

Two prismatic blocks 46 and 47 of stainless steel are polished on their slant faces, which are normally at an angle of 45° or 60° to each other. The block 46 has two vertical flat springs 48, 48 soldered to it, and the lower ends of the springs are clamped by screws 49, 49 to the end of the block 41. Two nearly horizontal flat springs 50, 50 are also soldered to the block 46 and have their ends clamped by screws 51, 51 to the upper face of the extension 42. The block 46 is hinged by the four springs 48, 48 and 50, 50 about the edge opposite its reflecting face without any backlash. The slight bend shown in the springs 50, 50 provides clearance for clockwise rotation of the block 46 as viewed in Figure 6.

The block 47 has two vertical springs 52, 52 soldered to it, and the lower ends of these springs are clamped by screws 53, 53 to the inner faces of the blocks 44. Two horizontal springs 54, 54 are clamped by screws 55, 55 to the top faces of the blocks 44 and are soldered to the block 47 at a part recessed to bring the hinge axis to a higher level than that of the block 46. The hinge axes of the two blocks 46 and 47 are so located that the adjacent edges of the blocks, which are practically in contact, are midway between the hinge axes both vertically and horizontally when the blocks are in their normal position. Both edges will thus move in the same direction by the same amount and without appreciable movement towards or away from each other if the blocks are tilted by equal small angles in opposite directions about their respective hinge axes.

Two pieces of spring steel 56, 56 are soldered to the two blocks 46 and 47 on their horizontal faces. Due to the arrangement just referred to this connection between the blocks will not restrict a tilting movement of the order in question. The springs 56, 56 are clamped in a block 57 provided with a pair of gauge points 58 which are adapted to be held in punch marks on the specimen by any suitable means, such as spring pressure. The longitudinal distance between the points 45 and 58 is the gauge length of the specimen. The left hand end of the base plate 41 and the right hand end of the block 57 are supported by means not shown to prevent any pivoting movement about the lines through the gauge points 45 and 58 respectively. As a result the movement of the block 57 in relation to the base plate 41 is exactly the same as the change of dimension between the punch marks on the specimen engaged by the gauge points.

Any change in the gauge length will thus cause the springs 56 to move horizontally in relation to the base 41 and the hinge axes of the blocks 46 and 47, and the angular displacement of each block will be equal in circular measure to the relative horizontal movement divided by the vertical height of the adjacent edges of the blocks above and below their respective hinge axes. The vertical movement of the adjacent edges of the blocks will be taken up by slight flexing of the springs 56, 56. The angular displacement of the blocks 46 and 47 is read by means of an autocollimator like that of Figures 1 and 2, and the scale of Figure 5 may be graduated directly in length units for this purpose.

The invention is applicable to other fine measurements than those specifically described. Thus for instance the casing 1 of Figures 1 and 2 may be provided with fixed pins to constitute with the pin 2 a spherometer or a device for measuring cylindrical curvature.

The hinge arrangement of Figures 1, 2 and 3 could be used with slight modification on the extensometer of Figures 6 to 9, and similarly the hinge arrangement of Figures 6 to 9 could be used on the comparator of Figures 1 to 5. The types of mirror disclosed are also suitable for either form of apparatus.

What we claim is:

1. A comparator comprising a base to be supported from a reference surface in spaced relationship thereto, a feeler pin movably mounted on the base to make contact with a surface displaced from the reference surface by a dimension to be measured, two mirrors set normally at an angle which is a sub-multiple of 180° and mounted to pivot about axes supported by the base and substantially parallel to the intersection line of the planes of their reflecting faces, a head on the feeler pin divided by a notch to form two elements each normally in contact with one mirror structure at a small distance from its respective pivot axis, the said distances from contact point to pivot axis being in opposite directions in the two mirrors, means for producing two optical images of a marking by successive reflection in the mirrors one by light impinging first on one mirror and one by light impinging first on the other mirror, the said images being coincident when the mirrors are in their normal positions, and means for observing the relative shift of the two images due to any departure of the angle between the mirrors from its normal value.

2. A comparator comprising a base to be supported from a reference surface in spaced relationship thereto, a feeler pin movably mounted on the base to make contact with a surface displaced from the reference surface by a dimension to be measured, two mirrors set normally at an angle which is a sub-multiple of 180° and mounted to pivot about axes supported by the base and substantially parallel to the intersection line of the planes of their reflecting faces, and the mirror edges nearest to the intersection line of their planes being in close proximity, a head on the feeler pin divided by a notch to form two elements each normally in contact with one mirror structure at a small distance from its respective pivot axis, the distances from contact point to pivot axis being in opposite directions in the two mirrors, and the pivot axes of the mirrors, the contact points of the pin head elements with the mirror structures and the edges of the mirrors nearest the intersection of their planes all lying substantially in the same plane, means for producing two optical images of a marking by successive reflection in the mirrors one by light impinging first on one mirror and one by light impinging first on the other mirror, the said images being coincident when the mirrors are in their normal positions, and means for observing the relative shift of the two images due to any departure of the angle between the mirrors from its normal value.

3. A comparator comprising a casing with a base to be supported from a reference surface in spaced relationship thereto, a feeler pin movably mounted on the base and having a head at one end and the other end adapted to make contact with a surface displaced from the reference surface by a dimension to be measured, a flat spring strip attached by one end thereof to the head of the pin and by the other to the casing, two further flat spring strips set at a substantial angle to each other attached by one end of each to the pin near its second mentioned end and by the other end of each to the casing, the three spring strips having their flat surfaces normally perpendicular to the pin axis, two mirrors set normally at an angle which is a sub-multiple of 180° and mounted to pivot about axes fixed to the casing and substantially parallel to the intersection line of the planes of their reflecting faces, the head on the feeler pin being divided by a notch to form two elements each normally in contact with one mirror structure at a small distance from its respective pivot axis, the said distances from contact point to pivot axis being in opposite directions in the two mirrors, means for producing two optical images of a marking by successive reflection in the mirrors one by light impinging first on one mirror and one by light impinging first on the other mirror, the said images being coincident when the mirrors are in their normal positions, and means for observing the relative shift of the two images due to any departure of the angle between the mirrors from its normal value.

REGINALD STANLEY CLAY.
JAMES ALFRED MOORE.

(References on following page)

REFERENCES CITED

The following references are of record in the file of this patent:

UNITED STATES PATENTS

| Number | Name | Date |
|---|---|---|
| 315,103 | Williams | Apr. 7, 1885 |
| 1,950,243 | House | Mar. 6, 1934 |
| 2,010,301 | Helfer | Aug. 6, 1935 |
| 2,435,949 | Worthen | Feb. 10, 1948 |

FOREIGN PATENTS

| Number | Country | Date |
|---|---|---|
| 415,520 | Great Britain | Aug. 30, 1934 |
| 553,988 | Great Britain | June 15, 1943 |